United States Patent [19]

Kim

[11] Patent Number: 5,721,638
[45] Date of Patent: Feb. 24, 1998

[54] WIDE-ANGLE VARIABLE MAGNIFICATION VIEWFINDER

[75] Inventor: Moon-Hyeon Kim, Kyeongsangnam-do, Rep. of Korea

[73] Assignee: Samsung Aerospace Industries, Ltd., Kyeongsangnam-do, Rep. of Korea

[21] Appl. No.: 735,596

[22] Filed: Oct. 23, 1996

[30] Foreign Application Priority Data

Dec. 11, 1995 [KR] Rep. of Korea .............. 95-48400

[51] Int. Cl.$^6$ .................. G02B 23/00; G02B 15/14
[52] U.S. Cl. .................. 359/432; 359/422; 359/431; 359/676; 359/686
[58] Field of Search .............. 359/362, 420–422, 359/431–433, 676–678, 683–686, 771, 781; 396/373–386

[56] References Cited

U.S. PATENT DOCUMENTS

| | | |
|---|---|---|
| 4,842,395 | 6/1989 | Sato et al. ............... 359/431 |
| 5,086,353 | 2/1992 | Mukai et al. ............ 359/431 |
| 5,231,534 | 7/1993 | Kato ...................... 359/432 |
| 5,235,460 | 8/1993 | Abe ....................... 359/432 |
| 5,323,264 | 6/1994 | Kato ...................... 359/432 |
| 5,448,400 | 9/1995 | Kikuchi et al. ......... 359/687 |
| 5,555,431 | 9/1996 | Kim ....................... 359/676 |

FOREIGN PATENT DOCUMENTS

| | | | |
|---|---|---|---|
| 49408 | 8/1994 | European Pat. Off. ........ 359/432 |
| 4-277724 | 9/1992 | Japan . | |

*Primary Examiner*—Thong Nguyen
*Attorney, Agent, or Firm*—Finnegan, Henderson, Farabow, Garrett & Dunner, L.L.P.

[57] ABSTRACT

A wide-angle variable magnification viewfinder comprises from an object side: an objective lens group of a positive refractive power, including a fixed first lens unit of a negative refractive power, a movable second lens unit of a negative refractive power for compensating the change of a view angle, a movable third lens unit of a positive refractive power for changing the magnification of the optical system, a prism for erecting an image, a fixed fourth lens unit of a positive refractive power; and an eyepiece lens group of a positive refractive power; wherein the objective lens group forms an actual image of an object and the actual image can be observed through the eyepiece lens group; and wherein $-1.20<L_t/f_1<-0.75$, $0.04<m2w \times m2_t<0.13$; where $f_1$ represents a focal length of the first lens unit of the objective lens group, $L_t$ represents a distance from the first lens surface of the objective group to a focal point of the objective lens group, $m2w$ represents the magnification of the second lens unit of the objective lens group at a wide-angle position, and $m2_T$ represents a magnification of the second lens unit of the objective lens group at a telephoto position.

3 Claims, 14 Drawing Sheets

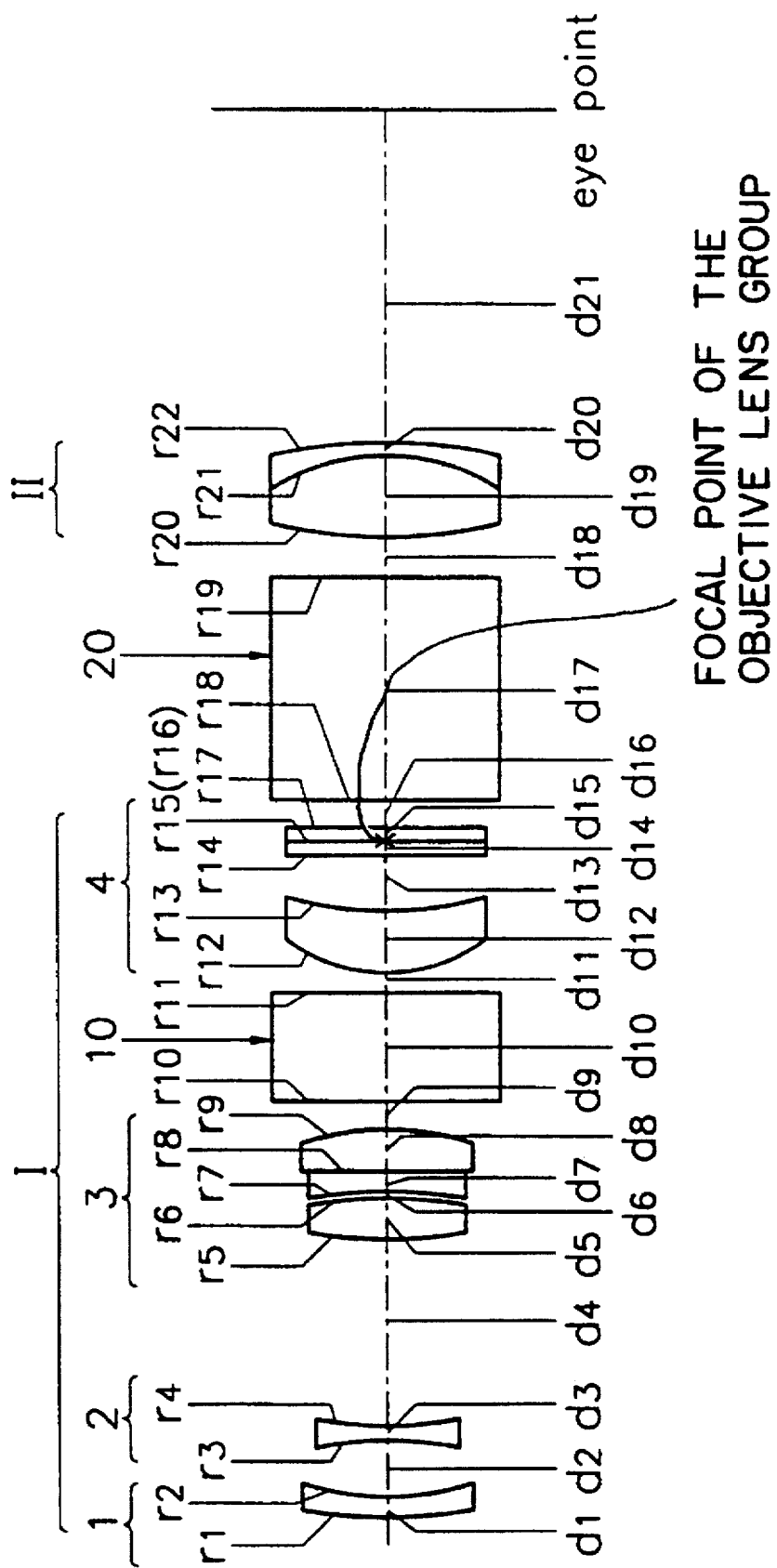

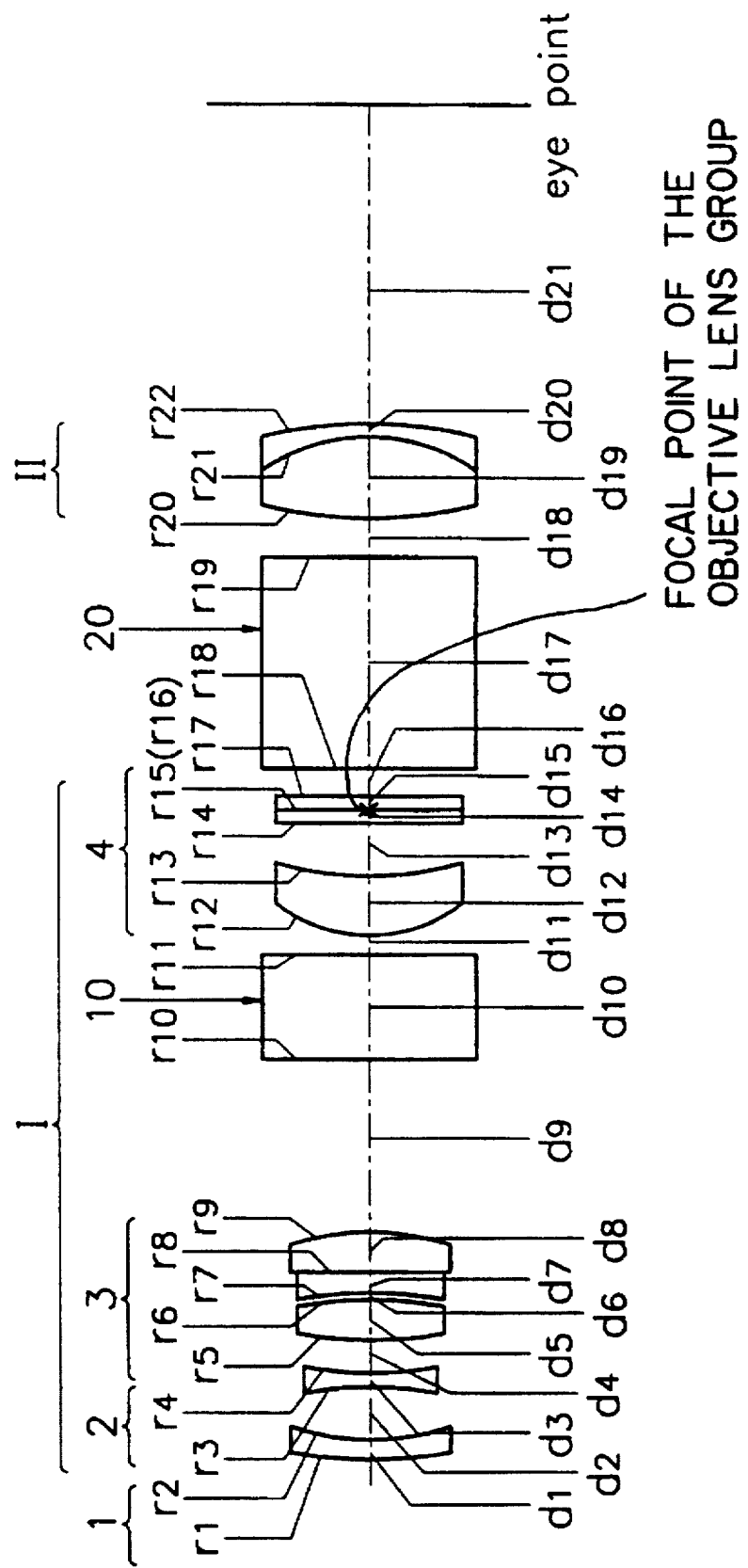

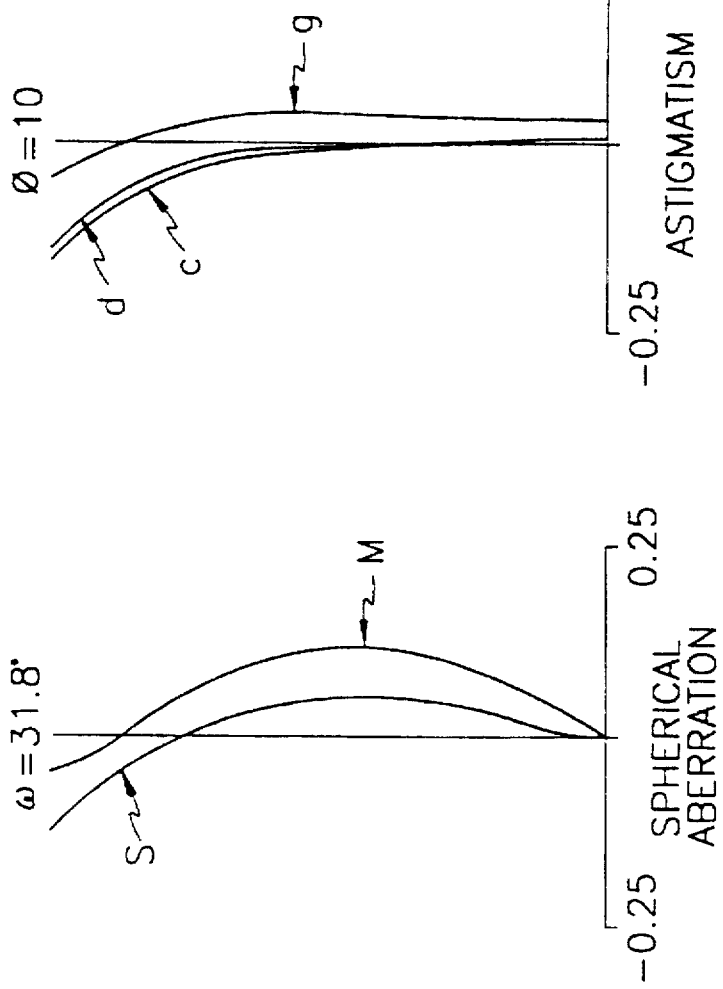

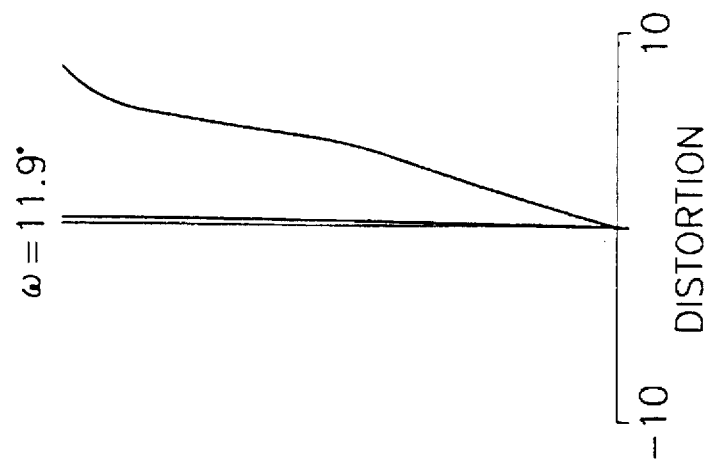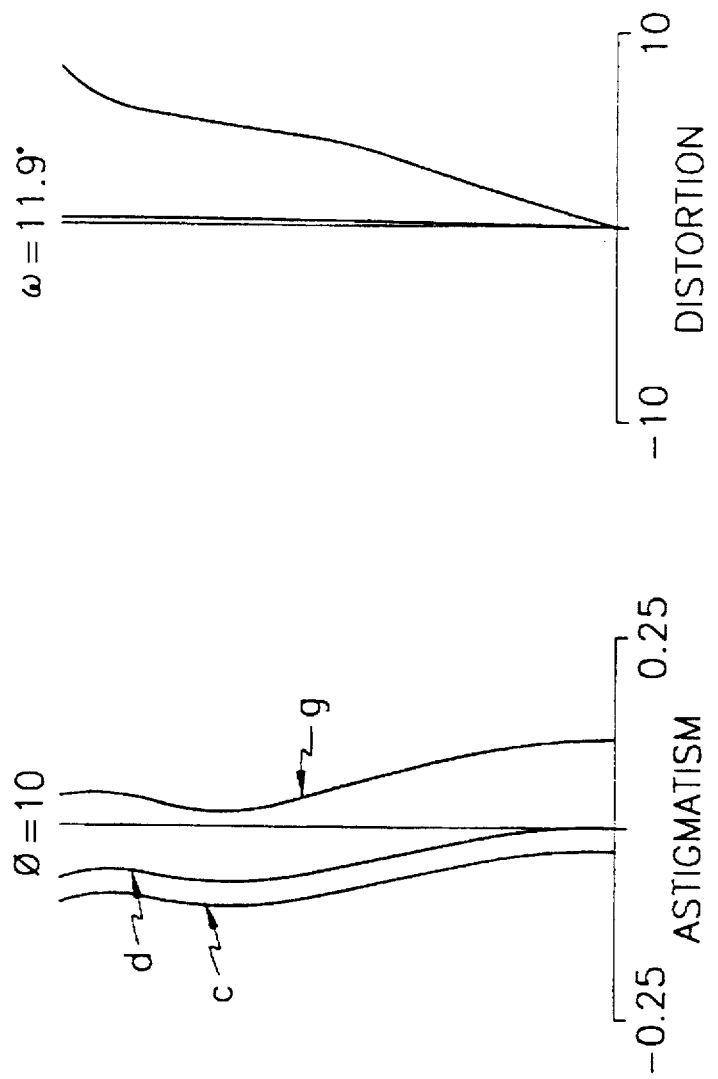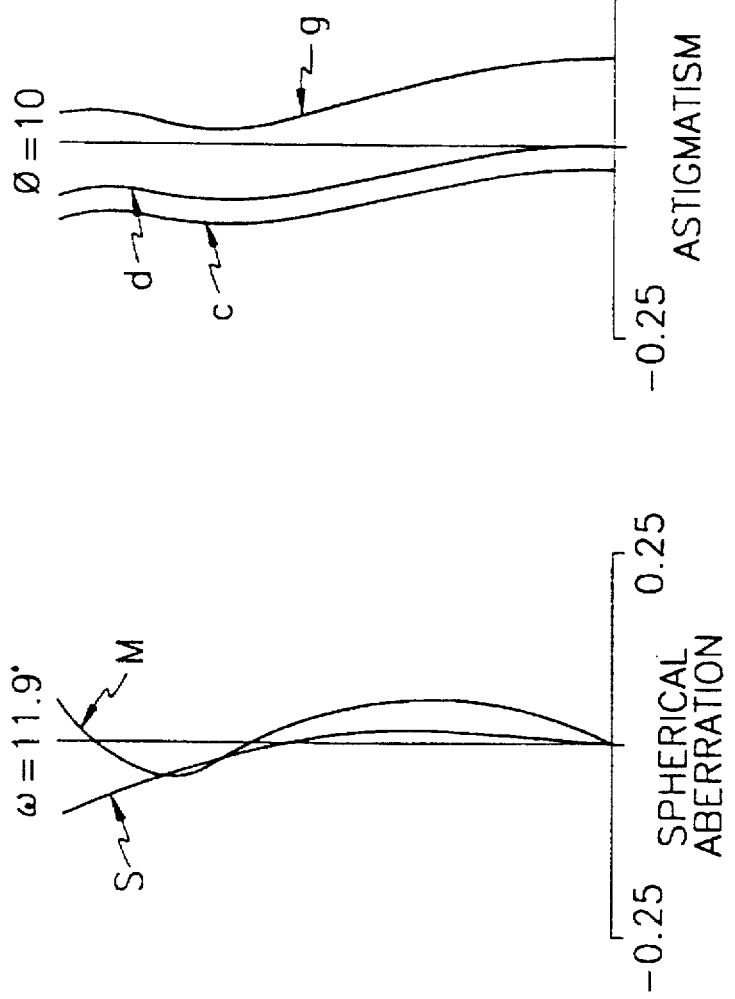

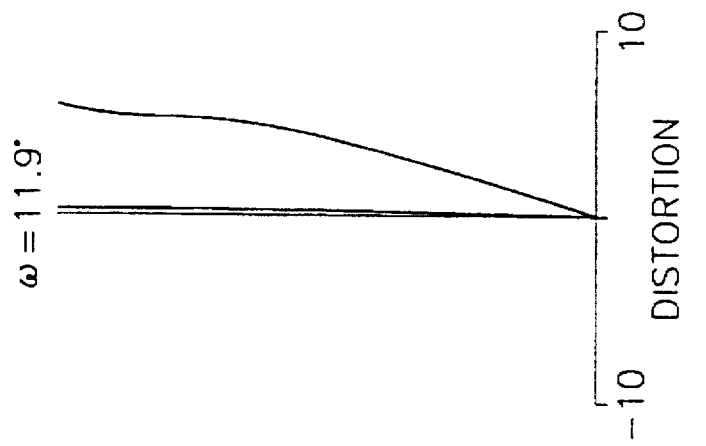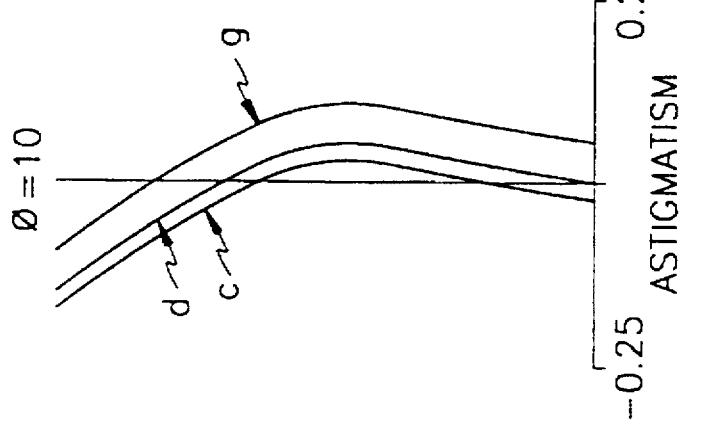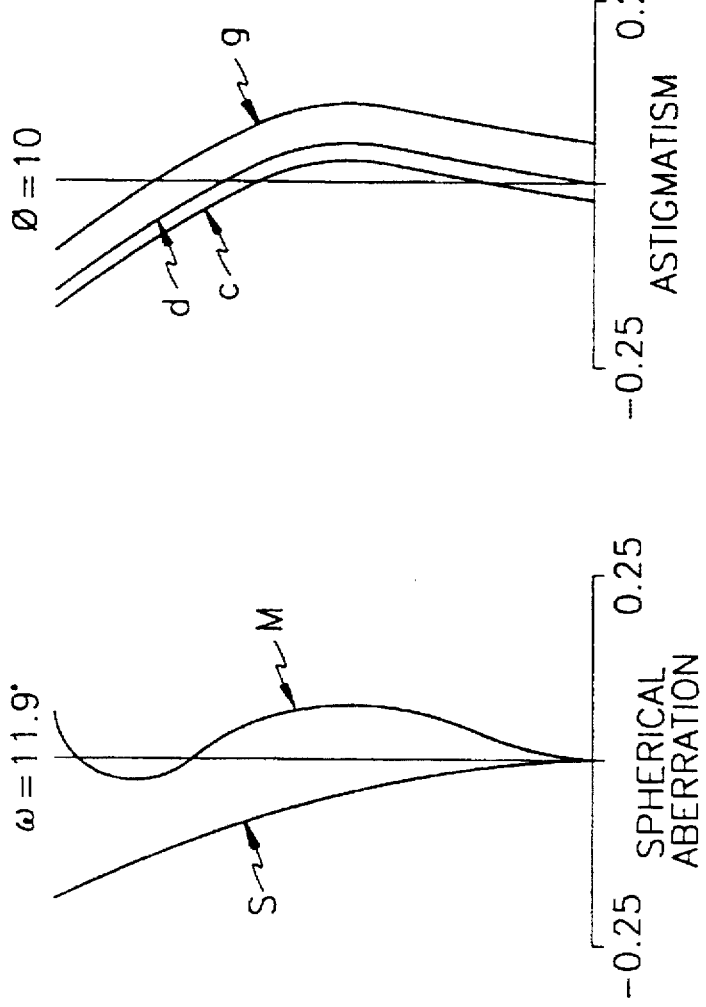

WIDE-ANGLE VARIABLE MAGNIFICATION VIEWFINDER

BACKGROUND OF THE INVENTION

A. Field of the Invention

The present invention relates to a wide-angle variable magnification viewfinder. More particularly, the present invention relates to a wide-angle variable magnification viewfinder that can make a wide-angle variable magnification finder compact by reducing the entire length of a real image variable finder optical system of a lens shutter camera or a video camera, obtain a visual field having a wide angle of about 63 degrees at a wide angle position, and have a zoom ratio of 2.7 times, thereby having good aberration performance from the wide angle position to a telephoto position.

B. Description of the Prior Art

Conventionally, most compact cameras employ a virtual image finder such as an Albada finder or an inverse Galilean finder. Such finders provide a relatively wide angle view and have a compact construction because they do not require a prism to erect an image. However, in such finders, a lens closest to an object must be large and the view field of the finder blurs in a marginal zone. Recently, because of the above-mentioned drawbacks, real image finders are employed instead of virtual image finders. Therefore, a real image optical system is more relevant to developing a picture-taking lens of a compact camera with a wide angle view.

In the above-mentioned real image finder optical systems, an objective lens group and a condenser lens group form an image of an object, and the enlarged image of the object is observed through an eyepiece group.

However, the marginal zone of view is positioned on the image formed through the objective lens group, so that the field of view is restricted and in order to form an objective image once in the finder, the finder becomes more complex to construct and larger in size.

When a real image finder optical system is compact, a wide angle view may be achieved if an image formed through the objective lens is reduced in size by shortening the focal distance of the objective lens at a wide angle position.

However, the refractive power of the objective lens increases as the focal distance of the objective lens decreases, so that it is difficult to compensate for aberrations.

Accordingly, it is not possible to make a real image finder which is both compact and achieves a wide angle view.

The real image finder is employed, with the panoramic function of a compact camera being added thereto. Furthermore, the following conventional techniques have been proposed to provide a real image finder that accommodates compactness of the camera and a picture-taking lens with a wide view angle.
1. Japanese Patent Application Unexamined Publication No. Hei 6-102454
2. U.S. Pat. No. 4,842,395
3. U.S. Pat. No. 5,086,353

The Japanese Patent Application Unexamined Publication No. Hei 6-102454 discloses a variable magnification finder which has a variation ratio of less than 2.0 times and has a disadvantage in that it is difficult to obtain a higher magnification than 2.0 times due to a distortion aberration caused by the large power of a second lens unit.

In addition, the U.S. Pat. No. 4,842,395 and the U.S. Pat. No. 5,086,353 disclose finders similar in construction. These finders have variation ratios of 2.0 times and compensate for aberrations by moving a first lens group. Moreover, these finders have disadvantages in that, first, an additional coverglass should be inserted when assembling the camera and, second, general aberration balance is liable to break since the camera includes three lens groups, whereby the power of the second lens unit becomes strong.

SUMMARY OF THE INVENTION

An object of the present invention is to provide a wide-angle variable magnification viewfinder which is made compact by reducing the entire length of a real image variable viewfinder optical system of a lens shutter camera or a video camera.

To achieve the above object in accordance with the purpose of the present invention, a wide-angle variable magnification viewfinder, comprises from the object side: an objective lens group of a positive refractive power, including a fixed first lens unit of a negative refractive power, a movable second lens unit of a negative refractive power for compensating the change of a view angle, a movable third lens unit of a positive refractive power for changing the magnification of the optical system, a prism for erecting an image, a fixed fourth lens unit of a positive refractive power; and an eyepiece lens group of a positive refractive power; wherein the objective lens group forms an actual image of an object and the actual image can be observed through the eyepiece lens group; and wherein the optical system fulfills the following conditions;

$$-1.20 < L_r / f_1 < -0.75$$

$$0.04 < m2w \times m2_T < 0.13$$

where:
- $f_1$ represents a focal length of the first lens unit of the objective lens group;
- $L_r$ represents a distance from a first lens surface of the objective group to a focal point of the objective lens group;
- $m2w$ represents the magnification of a second lens unit, of the objective lens group, at a wide-angle position; and
- $m2_T$ represents a magnification of the second lens unit, of the objective lens group, at a telephoto position.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings illustrate embodiments of the invention and, together with the description, serve to explain its principles.

In the drawings:

FIGS. 1A and 1B are schematic sectional views illustrating lens groups of a wide-angle variable magnification viewfinder, in accordance with a first preferred embodiment of the present invention, at a wide angle position and a telephoto position respectively;

FIGS. 2A to 2C are views illustrating aberrations of a wide-angle variable magnification viewfinder, in accordance with the first embodiment of the present invention, at a wide angle position;

FIGS. 3A to 3C are views illustrating aberrations of a wide-angle variable magnification viewfinder, in accordance with the first embodiment of the present invention, at a telephoto position;

FIGS. 6A to 6C are views illustrating aberrations of a wide-angle variable magnification finder in accordance with the second embodiment of the present invention at a telephoto position;

DESCRIPTION OF THE PREFERRED EMBODIMENTS

Reference will now be made in detail to preferred embodiments of the present invention, examples of which are illustrated in the accompanying drawings.

Figure 4A:
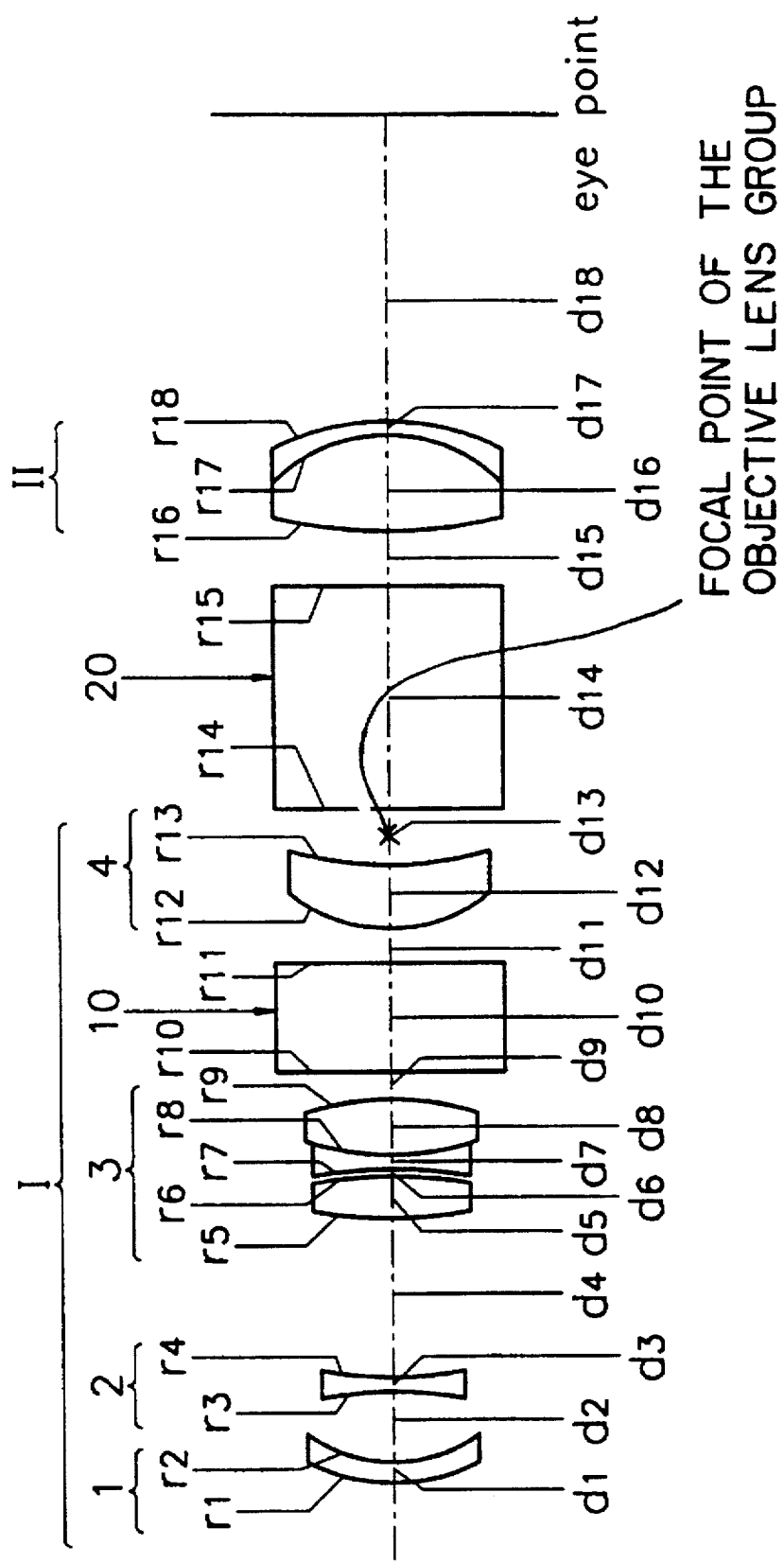
FIGS. 4A and 4B are schematic sectional views illustrating lens groups of a wide-angle variable magnification viewfinder, in accordance with the second embodiment of the present invention, at a wide angle position and a telephoto position respectively.
Figure 4B:
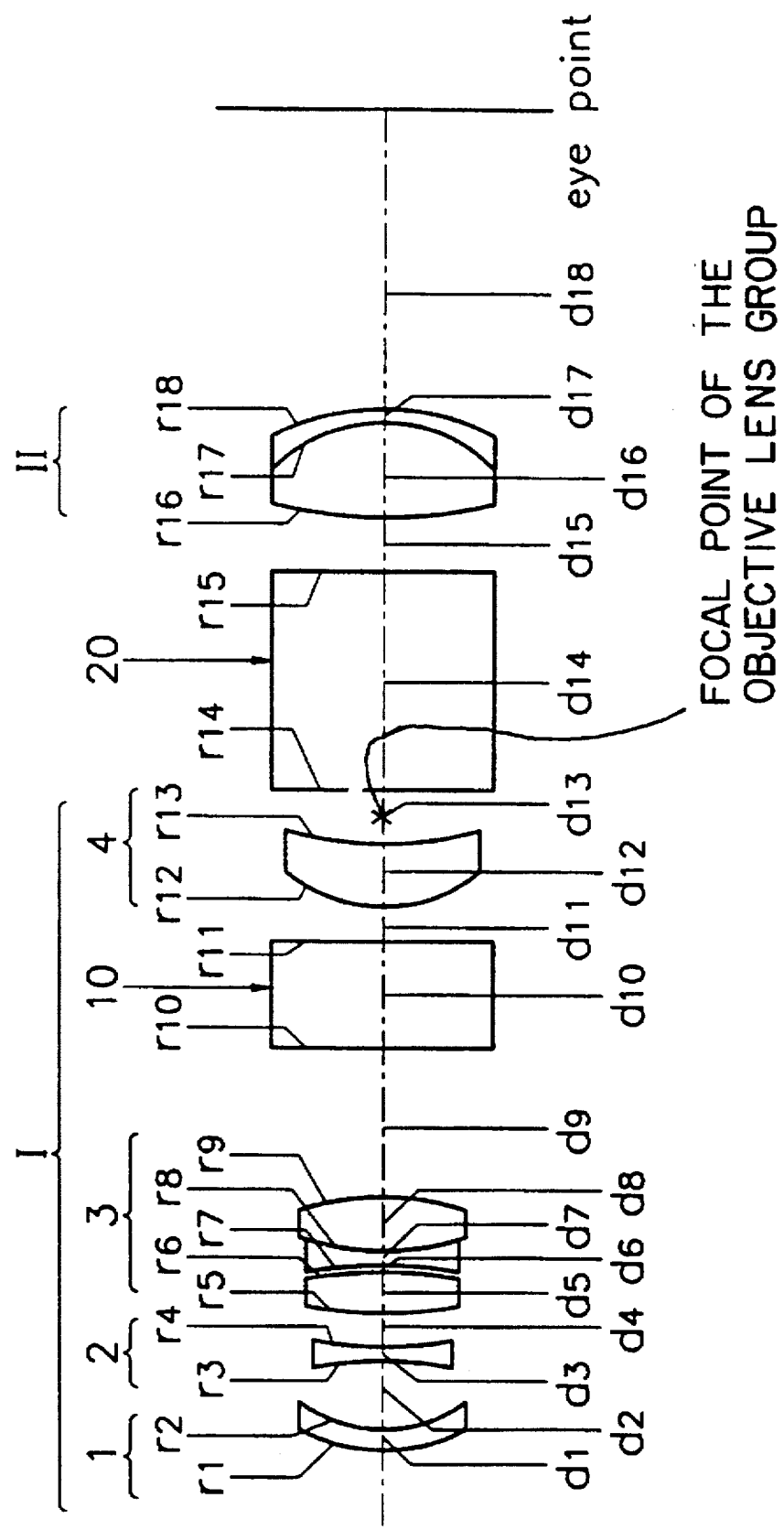
Figure 5C:
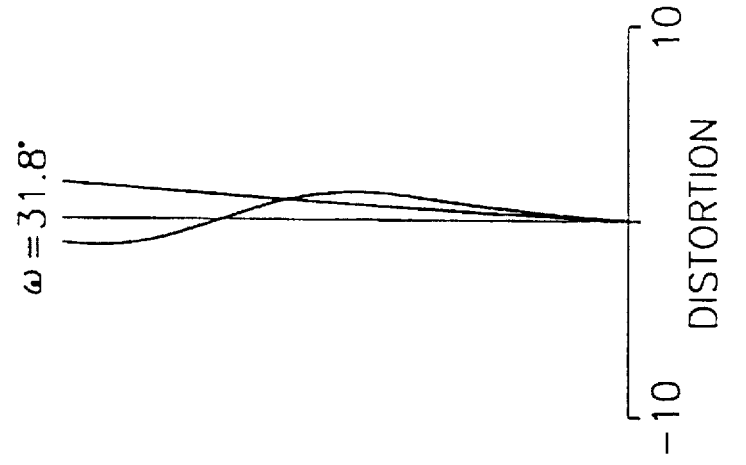
FIGS. 5A to 5C are views illustrating aberrations of a wide-angle variable magnification viewfinder, in accordance with the second embodiment of the present invention, at a wide angle position.
Figure 5B:
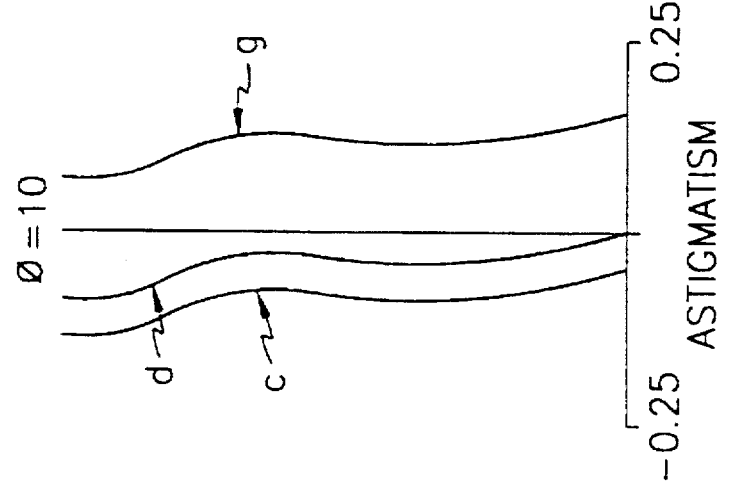
Figure 5A:
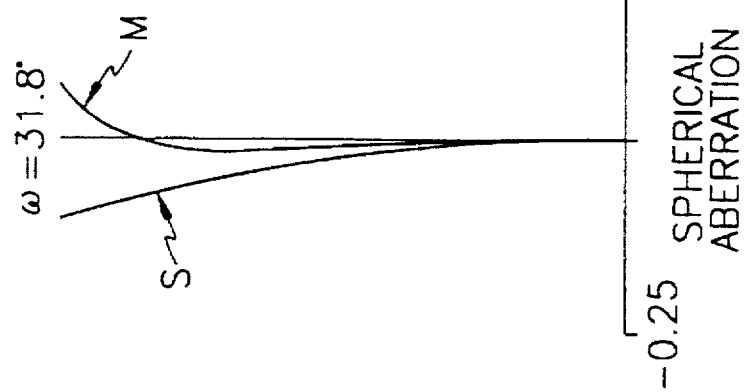
Figure 7A:
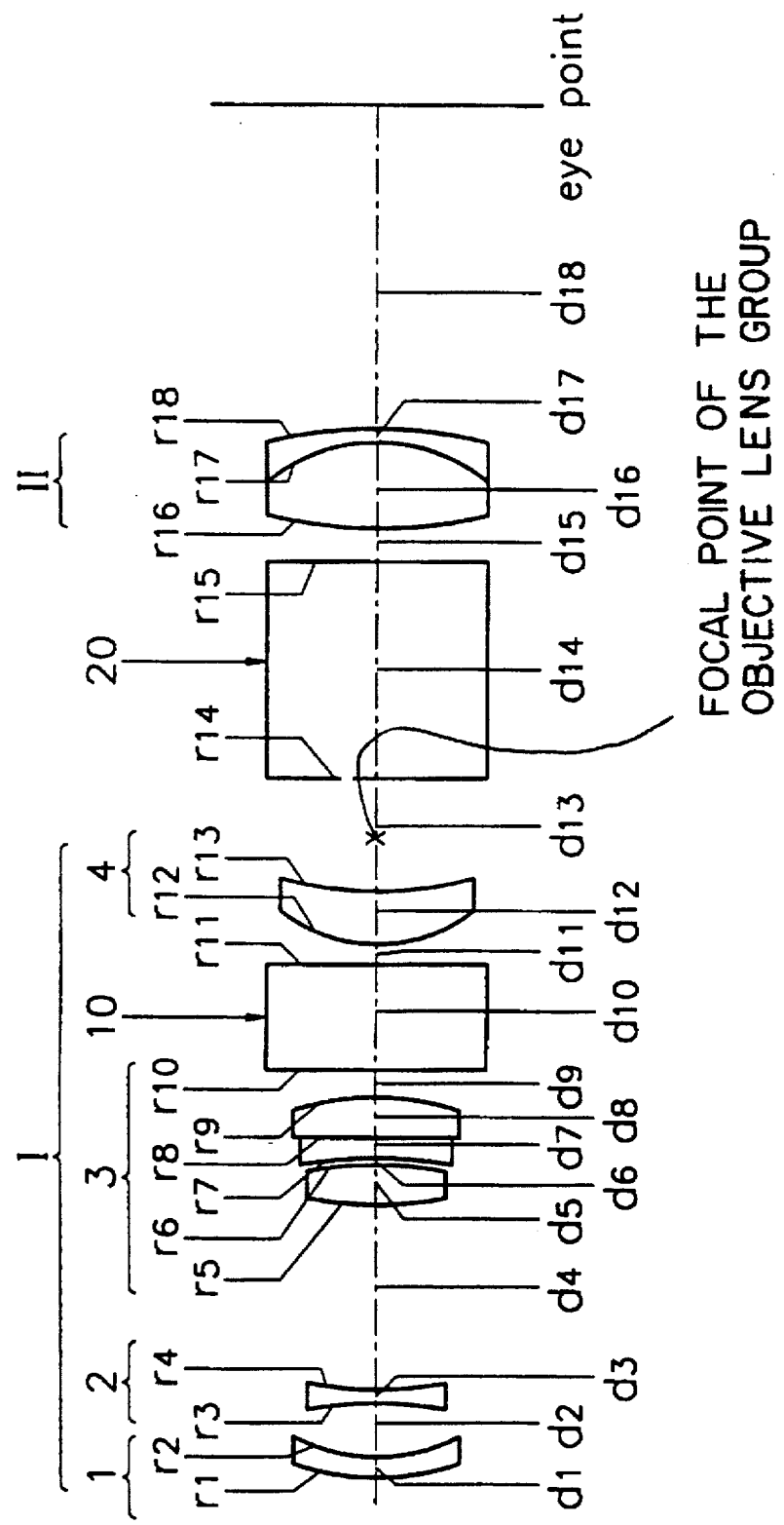
FIGS. 7A and 7B are schematic sectional views illustrating lens groups of a wide-angle variable magnification viewfinder, in accordance with third and fourth embodiments of the present invention, at a wide angle position and a telephoto position respectively.
Figure 7B:
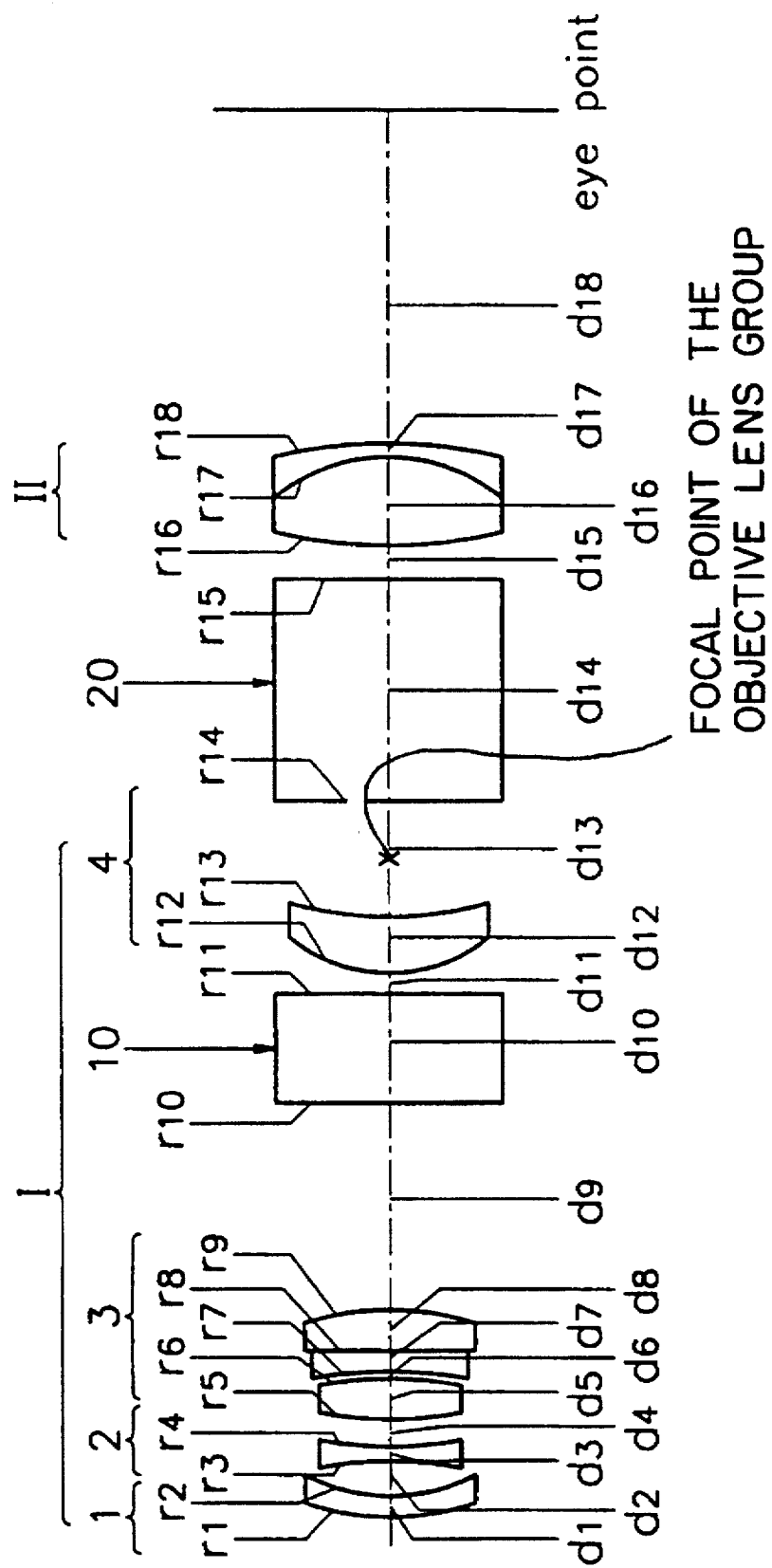
Figure 8C:
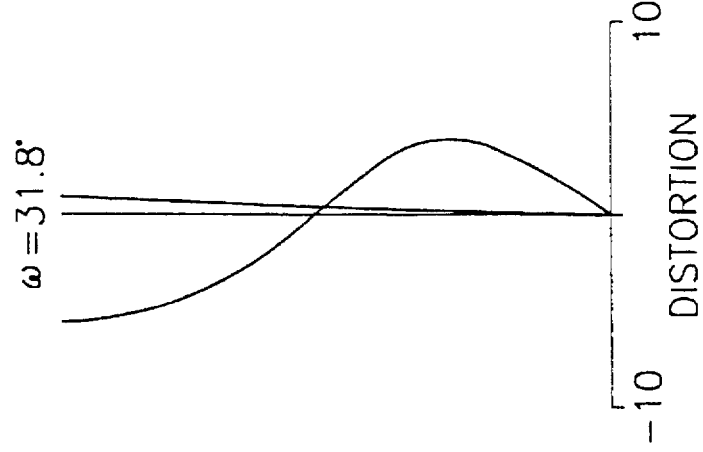
FIGS. 8A to 8C are views illustrating aberrations of a wide-angle variable magnification viewfinder, in accordance with the third embodiment of the present invention, at a wide angle position.
Figure 8B:
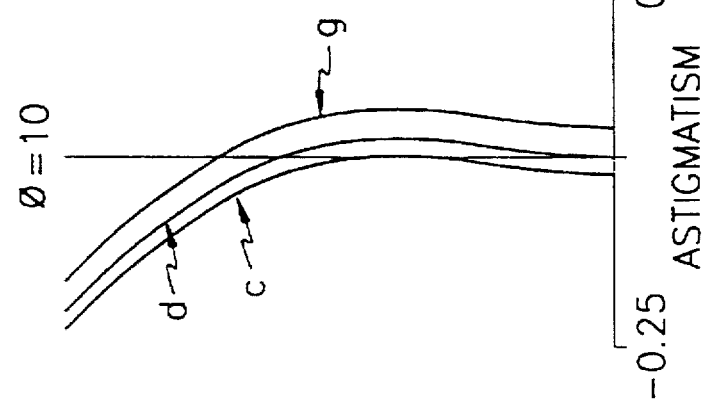
Figure 8A:
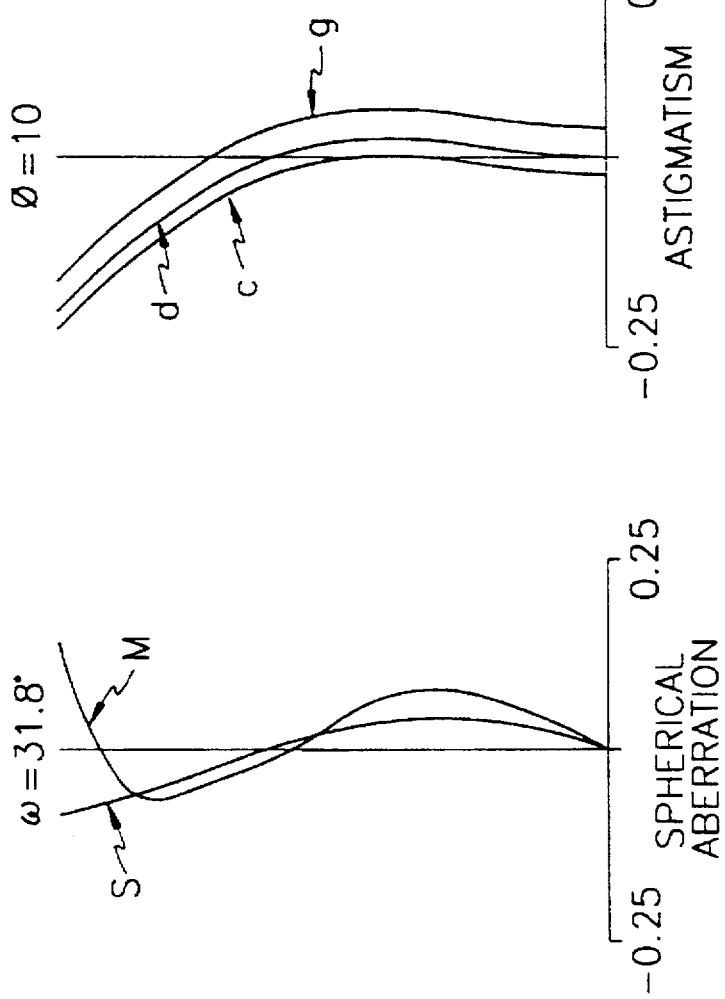
Figure 9C:
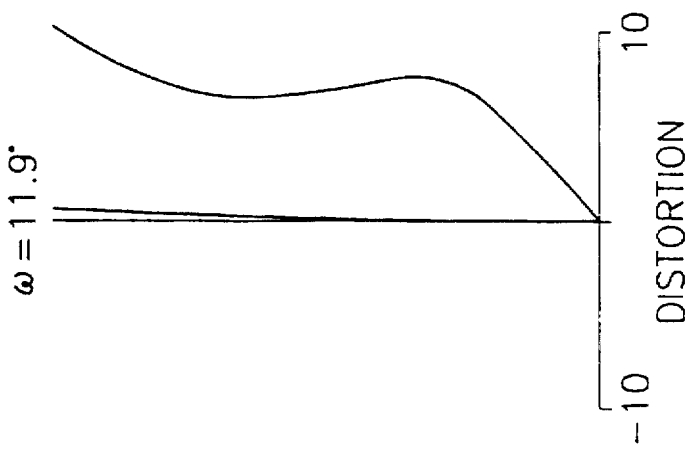
FIGS. 9A to 9C are views illustrating aberrations of a wide-angle variable magnification viewfinder, in accordance with the third embodiment of the present invention, at a telephoto position.
Figure 9B:
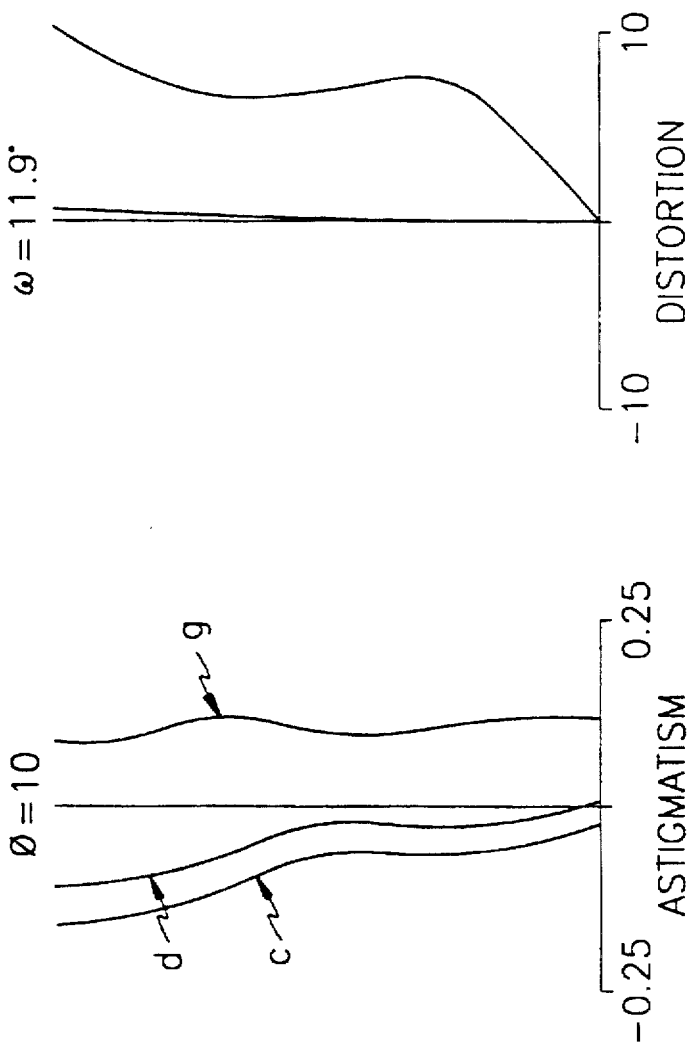
Figure 9A:
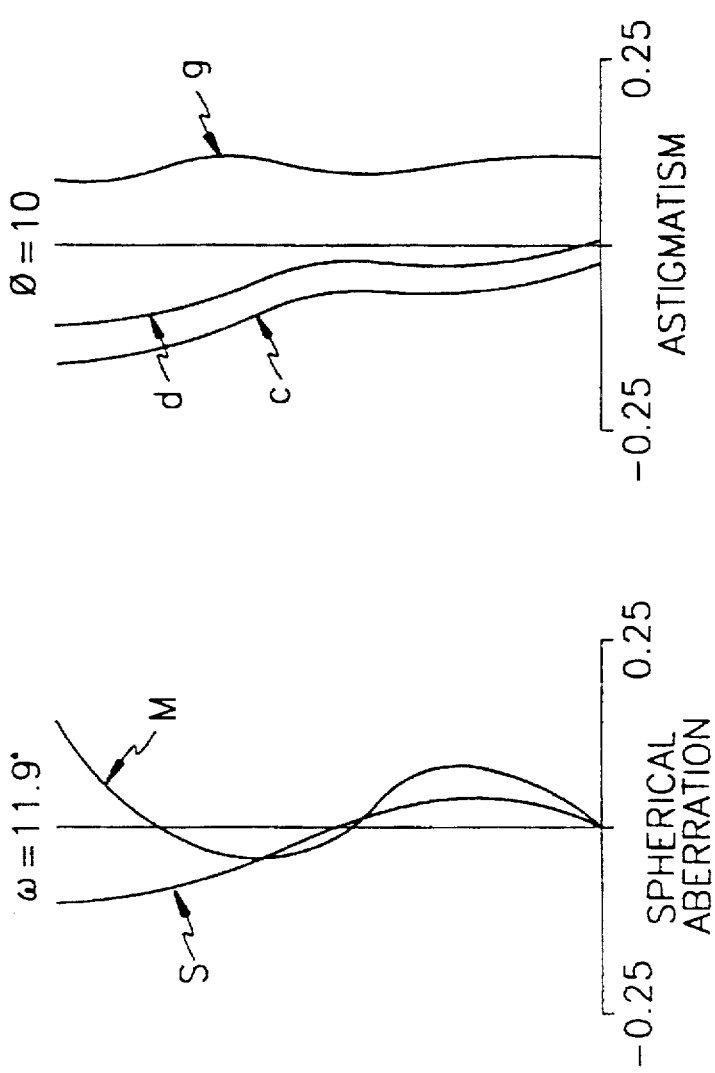
Figure 10C:
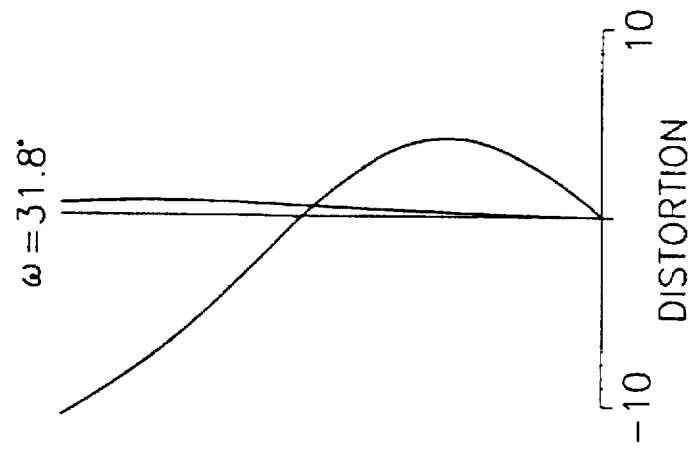
FIGS. 10A to 10C are views illustrating aberrations of a wide-angle variable magnification viewfinder, in accordance with the fourth embodiment of the present invention, at a wide angle position.
Figure 10B:
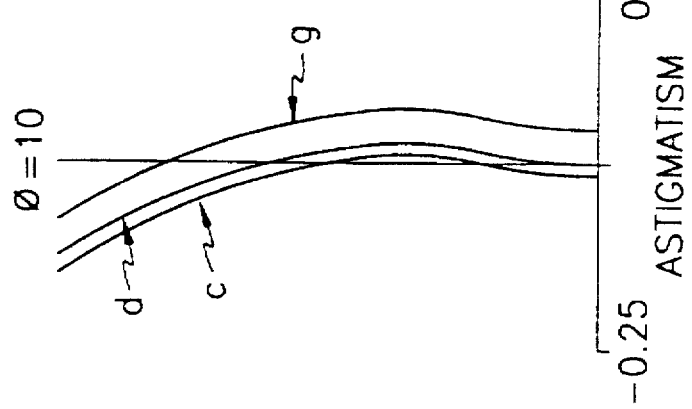
Figure 10A:
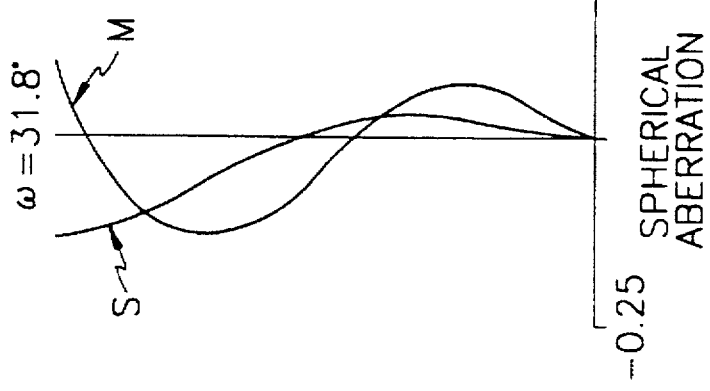
Figure 11C:
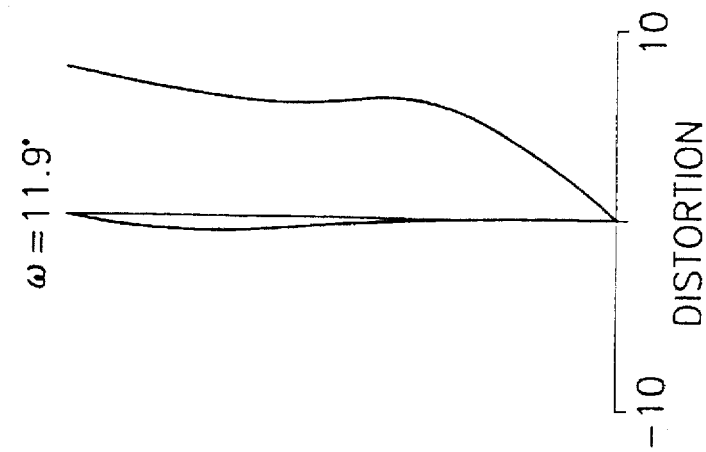
FIGS. 11A to 11C are views illustrating aberrations of a wide-angle variable magnification viewfinder, in accordance with the fourth embodiment of the present invention, at a telephoto position.
Figure 11B:
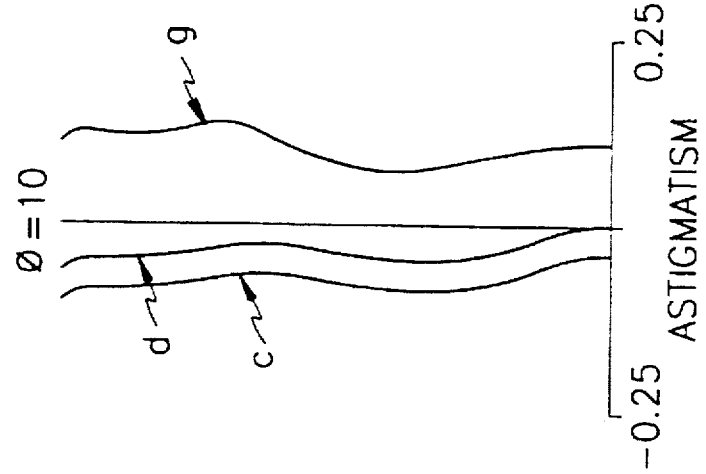
Figure 11A:
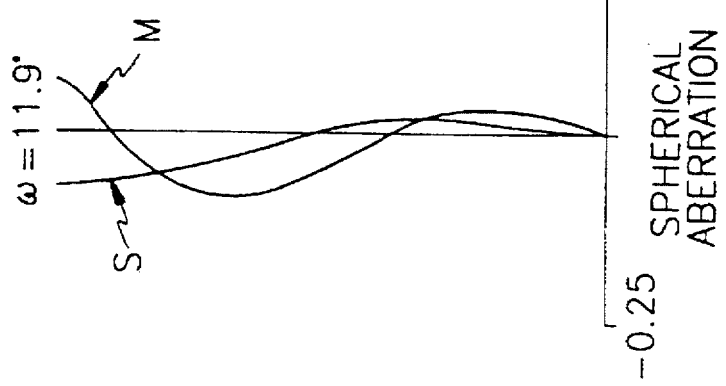

Referring to either FIGS. 1, 4, or 7, the present invention provides a wide-angle variable magnification viewfinder, comprising from the objective side: an objective lens group I of a positive refractive power, including a fixed first lens unit 1 of a negative refractive power, a movable second lens unit 2 of a negative refractive power for compensating the change of a view angle, a movable third lens unit 3 of a positive refractive power for changing the magnification of the optical system, a first prism 10 for erecting an image, a fixed fourth lens unit 4 of a positive refractive power; and an eyepiece lens group II of a positive refractive power; wherein objective lens group I forms an actual image of an object and the actual image can be observed through eyepiece lens group II.

In particular, third lens unit 3 includes at least one aspheric surface and at least two lenses of a positive refractive power, fourth lens unit 4 includes a convex lens toward the object and at least one aspheric surface is employed between first lens unit 1 and fourth lens unit 4, and eyepiece lens group II includes at least two abutting lenses, each with different refractive powers.

First image formation is made near fourth lens unit 4, the view angle of the viewfinder is controlled by moving eyepiece lens group II, and a second prism 20 is mounted between fourth lens unit 4 and eyepiece lens group II in the wide-angle variable magnification viewfinder in accordance with the preferred embodiment of the present invention.

The operation of the wide-angle variable magnification viewfinder in accordance with the preferred embodiment of the present invention is as follows.

Objective lens group I is divided into several units, that is, a variation section, a compensation section and an image formation section and so on, thereby the refractive power is dispersed to make the aberration change by the magnification variation small and to obtain good aberration performance over a whole variation region with a relatively compact construction in the preferred embodiment of the present invention.

The aberrations such as a spherical aberration, a curvature of field and so on are reduced by making first lens unit 1 with one lens element which is convex toward the object and of negative refractive power, thereby reducing a load of the negative refractive power of second lens unit 2.

The wide-angle variable magnification viewfinder in accordance with the preferred embodiment of the present invention fulfills the following conditions;

$$-1.20 < L_f/f_1 < -0.75 \quad (1)$$

$$0.04 < m2w \times m2_T < 0.13 \quad (2)$$

where $f_1$ is the focal length of first lens unit 1, $L_f$ is the distance from a first lens surface of objective lens group I to a focal point, $m2w$ is the magnification of second lens unit 2 at a wide angle position, and $m2_T$ is the magnification of second lens unit 2 at a telephoto position.

Since the refractive power of first lens unit 1 becomes small when the focal length in condition (1) exceeds an upper limit, the load of the refractive power of second lens unit 2 becomes large, whereby various kind of aberrations occur.

On the contrary, it is possible that the view angle is wide at the wide angle position, but a distortion aberration and a spherical aberration become too large since the refractive power of first lens unit 1 becomes too large when the focal length falls below a lower limit of the range set forth in condition (1).

Second lens unit 2 includes one lens element which is concave toward an eye and has a negative refractive power. The power is properly divided and the aberrations in the other lens units decrease, thereby increasing the magnification ratio.

Accordingly, since the refractive power of second lens unit 2 becomes small when the magnification in condition (2) exceeds the upper limit, the refractive power of first lens unit 1 becomes large, or the refractive power of third lens unit 3 or fourth lens unit 4 becomes small, whereby power division balance breaks and all the aberrations increase.

On the contrary, since the refractive power of second lens unit 2 becomes large and the load of the aberrations increases when the magnification falls below the lower limit of the range set forth in condition (1), the aberrations increase.

In addition, the wide-angle variable magnification viewfinder in accordance with the preferred embodiment of the present invention fulfills the following conditions;

$$5.60 < L_t/fw < 6.40 \quad (3)$$

$$-5.20 < f_1/f_3 < -3.40 \quad (4)$$

where fw is the focal length of objective lens group I at the wide angle position, and $f_3$ is the focal length of third lens unit 3.

Since the entire length of the system at the wide angle position becomes too long when the focal length in condition (3) exceeds the upper limit, it is difficult to obtain a compact camera system. It is easy to obtain the compact camera system when the focal length at the wide angle position becomes too short, but a screen seen through the eyepiece becomes too small since a mask positioned at a focus surface of objective lens group I becomes small.

That is, the magnification of the object becomes too small and the object is seen too small.

On the contrary, the magnification increases since the focal length becomes too long at the wide angle position when the focal length falls below the lower limit of the range set forth in condition (3), but it is not possible to obtain a compact camera system since the focus surface becomes large.

The desired magnification ratio can not be obtained since the refractive power of third lens unit 3 becomes small when the focal length in condition (4) exceeds the upper limit.

On the contrary, the aberrations increase with the increased power since the refractive power of third lens unit 3 increases when the focal length falls below the lower limit of the range set forth in condition (4).

The wide-angle variable magnification viewfinder in accordance with the preferred embodiment of the present invention fulfills the following condition;

$$-0.20 < fw/f_1 < -0.11 \quad (5)$$

It is difficult to obtain the compact camera system since the focal length at the wide angle position becomes long when the focal length in condition (5) exceeds the upper limit, and the aberrations such as the curvature of field, the distortion and so on occur since the refractive power of second lens unit 2 increases.

On the contrary, it is possible to obtain the wide angle view but the aberrations occur since refractive power of first lens unit 1 increases when the focal length falls below the lower limit of the range set forth in condition (5).

As described above, by satisfying the conditions (1) to (5), the refractive power of each lens unit is properly divided, and the aberrations are also divided. In addition, it is possible to obtain the compact camera system and have good aberration performance from the wide angle position to the telephoto position as a whole.

A coefficient of an aspherical surface of the wide-angle variable magnification viewfinder in accordance with the preferred embodiment which fulfills the above-mentioned conditions (1) to (5) is expressed by the following equation.

$$X = \frac{Cy^2}{1 + \{1 - (K+1)C^2y^2\}^{1/2}} + A_4 y^4 + A_6 y^6 + A_8 y^8 + A_{10} y^{10}$$

where:

X represents an optical axial distance from the lens vertex;

y represents a vertical distance of the optical axis;

C represents a reciprocal of the radius of curvature;

K represents a conic number; and $A_4, A_6, A_8, A_{10}$ represent aspherical coefficients.

Values which satisfy the above-mentioned conditions are described below.

A radius of curvature of a refractive surface equals $r_i$ (i=1~23), a lens thickness or a distance between lenses equals $d_i$(i=1~22), a d-line refractive indices of a lens equals nd, an Abbe number of a lens equals ν, a magnification of an overall optical system equals m and a half viewing angle equals ω.

Values for the first preferred embodiment of the present invention are shown in table (1), and in accordance with the first preferred embodiment of the present invention, the viewing angle 2ω ranges from 63.6° to 23.9° and the magnification m ranges from 0.30 to 0.76.

TABLE 1

| surface number | radius of a curvature ($r_i$) | thickness ($d_i$) | refractive power (nd) | Abbe number (ν) |
|---|---|---|---|---|
| 1 | 29.528 | 1.20 | 1.49200 | 57.4 |
| *2 | 11.652 | variable | | |
| *3 | −100.000 | 1.10 | 1.49200 | 57.4 |
| *4 | 10.984 | variable | | |
| *5 | 12.964 | 1.74 | 1.73077 | 40.5 |
| 6 | −10.458 | 0.08 | | |
| 7 | −9.250 | 0.08 | 1.84666 | 23.8 |
| 8 | 211.600 | 2.23 | 1.48749 | 70.4 |
| 9 | −7.040 | variable | | |
| 10 | ∞ | 13.80 | 1.51680 | 64.2 |
| 11 | ∞ | 0.70 | | |
| *12 | 8.015 | 2.00 | 1.49200 | 57.4 |
| 13 | 17.857 | 2.24 | | |
| 14 | ∞ | 0.68 | 1.51680 | 64.2 |
| 15 | ∞ | 0.00 | | |
| 16 | ∞ | 0.68 | 1.51680 | 64.2 |
| 17 | ∞ | 1.91 | | |
| 18 | ∞ | 25.30 | 1.51680 | 64.2 |
| 19 | ∞ | 1.94 | | |
| 20 | 24.900 | 3.20 | 1.56883 | 56.0 |
| 21 | −8.520 | 0.80 | 1.72825 | 28.2 |
| 22 | −17.540 | 17.69 | | | where * represents the aspherical surface.

In the first preferred embodiment of the present invention, the above-mentioned distance between lenses and the coefficient of the aspherical surface vary according to a view angle as shown in tables (2) and (3).

TABLE 2

| | 2ω = 63.6° | 2ω = 31.8° | 2ω = 23.9° |
|---|---|---|---|
| d2 | 2.800 | 4.392 | 2.422 |
| d4 | 11.248 | 2.968 | 1.409 |
| d9 | 1.000 | 7.691 | 11.229 |

TABLE 3

| | aspherical coefficient of the second surface | aspherical coefficient of the third surface | aspherical coefficient of the fourth surface |
|---|---|---|---|
| K | −0.2512696E+2 | −0.1400000E+3 | −0.4641725E+1 |
| A4 | −0.1257878E−2 | −0.4788486E−2 | −0.4345190E−2 |
| A6 | −0.5649316E−4 | 0.4715623E−3 | 0.4640355E−3 |
| A8 | 0 | −0.4032126E−4 | −0.3182307E−4 |
| A10 | 0 | 0.1127703E−5 | 0.8434182E−6 |

| | aspherical coefficient of the fifth surface | aspherical coefficient of the twelfth surface |
|---|---|---|
| K | −0.2919821E+2 | −0.1985379E+2 |
| A4 | 0.9407351E−3 | 0.2335661E−2 |

TABLE 3-continued

| | | |
|---|---|---|
| A6 | −0.7973522E−4 | −0.1035986E−3 |
| A8 | 0.3905650E−5 | 0.3030414E−5 |
| A10 | −0.8932850E−6 | −0.6659352E−7 |

Values for the second embodiment of the present invention are shown in table (4) in which the viewing angle 2ω ranges from 63.6° to 23.9° and the magnification m ranges from 0.30 to 0.76.

TABLE 4

| surface number | radius of a curvature ($r_i$) | thickness ($d_i$) | refractive power (nd) | Abbe number (v) |
|---|---|---|---|---|
| 1 | 11.554 | 0.95 | 1.49200 | 57.4 |
| *2 | 7.132 | variable | | |
| *3 | −69.190 | 1.23 | 1.49200 | 57.4 |
| *4 | 9.266 | variable | | |
| *5 | 11.751 | 2.12 | 1.73077 | 40.5 |
| 6 | −9.792 | 0.10 | | |
| 7 | −22.191 | 0.95 | 1.84666 | 23.8 |
| 8 | 13.493 | 2.59 | 1.48749 | 70.4 |
| 9 | −10.394 | variable | | |
| 10 | ∞ | 12.55 | 1.51680 | 64.2 |
| 11 | ∞ | 0.70 | | |
| *12 | 9.062 | 2.39 | 1.49200 | 57.4 |
| 13 | 41.204 | 2.8 | | |
| 14 | ∞ | 23.90 | 1.51680 | 64.2 |
| 15 | ∞ | 1.30 | | |
| 16 | 27.961 | 4.00 | 1.67003 | 47.2 |
| 17 | −6.806 | 0.80 | 1.74077 | 27.8 |
| 18 | −19.416 | 17.69 | | | where * represents the aspherical surface.

In the second embodiment of the present invention, the above-mentioned distance between lenses and the coefficient of the aspherical surface vary according to the view angle as shown in tables (5) and (6).

TABLE 5

| | 2ω = 63.6° | 2ω = 31.8° | 2ω = 23.9° |
|---|---|---|---|
| d2 | 4.329 | 4.313 | 2.106 |
| d4 | 8.733 | 2.172 | 1.000 |
| d9 | 0.700 | 7.269 | 10.665 |

TABLE 6

| | aspherical coefficient of the second surface | aspherical coefficient of the third surface | aspherical coefficient of the fourth surface |
|---|---|---|---|
| K | −0.1922401E | 0.1000000E+3 | −0.4572424E+2 |
| A4 | −0.2320867E−3 | −0.4376919E−2 | 0.6326010E−3 |
| A6 | −0.2997789E−4 | 0.8787199E−4 | −0.3730645E−3 |
| A8 | 0 | −0.6817073E−5 | 0.3104425E−4 |
| A10 | 0 | 0.1687253E−7 | −0.9481383E−6 |

| | aspherical coefficient of the fifth surface | aspherical coefficient of the twelfth surface |
|---|---|---|
| K | −0.3733643E+2 | −0.2713206E+1 |
| A4 | 0.1628077E−2 | −0.6119120E−3 |
| A6 | −0.1439779E−3 | 0.8506654E−4 |
| A8 | 0.6963290E−5 | −0.4055182E−5 |
| A10 | −0.1464889E−6 | 0.6021318E−7 |

Values for the third embodiment of the present invention are shown in table (7) in which the viewing angle 2ω ranges from 63.6° to 23.9° and the magnification m ranges from 0.32 to 0.85.

TABLE 7

| surface number | radius of a curvature ($r_i$) | thickness ($d_i$) | refractive power (nd) | Abbe number (v) |
|---|---|---|---|---|
| 1 | 17.151 | 1.10 | 1.49200 | 57.4 |
| *2 | 8.377 | variable | | |
| *3 | −28.228 | 1.30 | 1.49200 | 57.4 |
| *4 | 13.656 | variable | | |
| *5 | 13.062 | 1.77 | 1.73077 | 40.5 |
| 6 | −10.883 | 0.10 | | |
| 7 | −12.446 | 0.85 | 1.84666 | 23.8 |
| 8 | 27.906 | 2.39 | 1.48749 | 70.4 |
| 9 | −7.043 | variable | | |
| 10 | ∞ | 14.30 | 1.51680 | 64.2 |
| 11 | ∞ | 0.70 | | |
| *12 | 8.096 | 2.00 | 1.49200 | 57.4 |
| 13 | 26.621 | 3.06 | | |
| 14 | ∞ | 23.90 | 1.51680 | 64.2 |
| 15 | ∞ | 1.85 | | |
| 16 | 26.415 | 3.30 | 1.67003 | 47.2 |
| 17 | −7.062 | 0.83 | 1.74077 | 27.8 |
| 18 | −20.939 | 15.84 | | | where * represents the aspherical surface.

In the third embodiment of the present invention, the above-mentioned thickness of lens, distance between lenses and the coefficient of the aspherical surface vary according to a view angle as shown in tables (8) and (9).

TABLE 8

| | 2ω = 63.6° | 2ω = 31.8° | 2ω = 23.9° |
|---|---|---|---|
| d2 | 3.493 | 4.028 | 1.775 |
| d4 | 9.698 | 2.144 | 0.973 |
| d9 | 1.000 | 8.012 | 11.450 |

TABLE 9

| | aspherical coefficient of the second surface | aspherical coefficient of the third surface | aspherical coefficient of the fourth surface |
|---|---|---|---|
| K | 0.1252602E | −0.7532519E+2 | −0.1105365E+3 |
| A4 | −0.2814715E−3 | −0.2055144E−2 | 0.1990969E−2 |
| A6 | −0.5939593E−4 | −0.2396540E−3 | −0.5777878E−3 |
| A8 | 0 | 0.1182074E−4 | 0.4361359E−4 |
| A10 | 0 | −0.2041804E−6 | −0.1182438E−5 |

| | aspherical coefficient of the fifth surface | aspherical coefficient of the twelfth surface |
|---|---|---|
| K | −0.4941326E+2 | −0.9899499E+3 |
| A4 | 0.1682265E−2 | 0.5217551E−2 |
| A6 | −0.1810961E−3 | −0.4040185E−3 |
| A8 | 0.9707358E−5 | 0.1783187E−4 |
| A10 | −0.2196872E−6 | −0.3293973E−6 |

Values for the fourth embodiment of the present invention are shown in table (10) in which the viewing angle 2ω ranges from 63.6° to 23.9° and the magnification m ranges from 0.30 to 0.77.

TABLE 10

| surface number | radius of a curvature ($r_i$) | thickness ($d_i$) | refractive power (nd) | Abbe number (v) |
|---|---|---|---|---|
| 1 | 21.040 | 1.10 | 1.49200 | 57.4 |
| *2 | 11.111 | variable | | |
| *3 | −100.000 | 1.30 | 1.49200 | 57.4 |
| *4 | 8.891 | variable | | |
| *5 | 12.384 | 1.71 | 1.73077 | 40.5 |
| 6 | −10.320 | 0.08 | | |
| 7 | −9.288 | 0.85 | 1.84666 | 23.8 |
| 8 | 76.422 | 2.31 | 1.48749 | 70.4 |
| 9 | −6.318 | variable | | |
| 10 | ∞ | 14.30 | 1.51680 | 64.2 |
| 11 | ∞ | 0.70 | | |
| *12 | 9.953 | 2.00 | 1.49200 | 57.4 |
| 13 | 49.911 | 4.06 | | |
| 14 | ∞ | 25.30 | 1.51680 | 64.2 |
| 15 | ∞ | 1.90 | | |
| 16 | 29.168 | 3.64 | 1.67003 | 47.2 |
| 17 | −7.798 | 0.92 | 1.74077 | 27.8 |
| 18 | −23.121 | 17.49 | | | where * represents the aspherical surface.

In the fourth embodiment of the present invention, the above-mentioned thickness of lens, distance between lenses and the coefficient of the aspherical surface vary according to a view angle as shown in tables (11) and (12).

TABLE 11

| | 2ω = 63.6° | 2ω = 31.8° | 2ω = 23.9° |
|---|---|---|---|
| d2 | 3.242 | 4.465 | 2.500 |
| d4 | 10.112 | 2.440 | 0.972 |
| d9 | 1.000 | 7.447 | 10.898 |

TABLE 12

| | aspherical coefficient of the second surface | aspherical coefficient of the third surface | aspherical coefficient of the fourth surface |
|---|---|---|---|
| K | 0.3307603E | −0.1100000E+3 | −0.4295365E+2 |
| A4 | −0.1940226E−3 | −0.1916460E−2 | 0.3469372E−2 |
| A6 | −0.4862763E−4 | −0.9219066E−5 | −0.6871324E−3 |
| A8 | 0 | −0.2553352E−4 | 0.4514409E−4 |
| A10 | 0 | 0.1840787E−5 | −0.1027063E−5 |

| | aspherical coefficient of the fifth surface | aspherical coefficient of the twelfth surface |
|---|---|---|
| K | −0.3956304E+2 | −0.1000000E+3 |
| A4 | 0.1503123E−2 | 0.2863686E−2 |
| A6 | −0.1595635E−3 | −0.1916809E−3 |
| A8 | 0.7511646E−5 | 0.6066814E−5 |
| A10 | −0.1436564E−6 | −0.6781150E−7 |

Values for the conditions in accordance with the first to the fourth embodiments of the present invention are shown in table (13).

TABLE 13

| Conditions | First Embodiment | Second Embodiment | Third Embodiment | Fourth Embodiment |
|---|---|---|---|---|
| $L_t/f_1$ | −1.03 | −0.95 | −1.16 | −0.81 |
| $m2_w/m2_T$ | 0.10 | 0.08 | 0.11 | 0.06 |

TABLE 13-continued

| Conditions | First Embodiment | Second Embodiment | Third Embodiment | Fourth Embodiment |
|---|---|---|---|---|
| $L_T/f_w$ | 6.17 | 5.88 | 6.25 | 6.09 |
| $f_1/f_3$ | −3.81 | −4.42 | −3.54 | −5.09 |
| $f_w/f_1$ | −0.17 | −0.16 | −0.19 | −0.13 |
| $L_t$ | 41.39 | 38.83 | 40.40 | 40.40 |
| $f_w$ | 6.7 | 6.6 | 6.46 | 6.63 |
| $f_t$ | 16.98 | 17.25 | 17.20 | 17.21 |
| $f_1$ | −40.01 | −40.76 | −34.71 | −49.67 |
| $f_2$ | −20.05 | −16.52 | −18.52 | −16.53 |
| $f_3$ | 10.51 | 9.22 | 9.80 | 9.75 |
| $m2_w$ | 0.32 | 0.27 | 0.33 | 0.24 |
| $m2_T$ | 0.32 | 0.28 | 0.34 | 0.24 |

As described above, the effect of the wide-angle variable magnification viewfinder in accordance with the embodiments of the present invention is that, first, it can make the wide-angle variable magnification finder compact by reducing the entire length, even though the prism for erecting the image is positioned between third lens unit 3 and fourth lens unit 4 of objective lens group I; second, it can obtain the visual field having the wide angle of about 63 degrees at the wide angle position; and, third, it has the zoom ratio of 2.7 times, thereby having good aberration performance from the wide angle position to the telephoto position as a whole in the real image variable finder optical system of the lens shutter camera or the video camera.

Other embodiments of the invention will be apparent to one skilled in the art from consideration of the specification and practice of the invention disclosed herein. It is intended that the specification and examples be considered as exemplary only, with the true scope and spirit of the invention being indicated by the following claims.

What is claimed is:

1. A wide-angle variable magnification viewfinder, comprising:

an objective lens group having an overall positive refractive power including, from an object side, a fixed first lens unit having a negative refractive power, a movable second lens unit having a concave exit surface and having a negative refractive power, a movable third lens unit of a positive refractive power, a first prism for erecting an image, and a fixed fourth lens unit of a positive refractive power;

an eyepiece group of a positive refractive power; and a second prism positioned between the fourth lens unit of the objective lens group and the eyepiece group;

wherein a viewfinder magnification is changed by moving the third lens unit, the change of a view angle is compensated by moving the second lens unit;

and wherein $$-1.20 < L_t/f_1 < -0.75$$

$$0.04 < m2_2 * m2_T < 0.13$$

where:

$f_1$ represents the focal length of the first lens unit, $L_t$ represents the distance from a first lens surface of the objective lens group to a focal point of the objective lens group;

$m2_w$ represents the magnification of the second lens unit at a wide angle position, and $m2_T$ represents the magnification of the second lens unit at a telephoto position.

2. The wide-angle variable magnification viewfinder of claim 1, wherein $$5.60 < L/fw < 6.40$$

$$-5.20 < f_1/f_3 < -3.40$$

where
fw represents the focal length of the objective lens group at the wide angle position, and $f_3$ represents the focal length of the third lens unit.

3. The wide-angle variable magnification viewfinder of claim 1, wherein $$-0.20 < fw/f_1 < -0.11.$$

* * * * *